(12) United States Patent
Doppler et al.

(10) Patent No.: US 8,402,335 B2
(45) Date of Patent: Mar. 19, 2013

(54) STATUS REPORT MESSAGES FOR MULTI-LAYER ARQ PROTOCOL

(75) Inventors: Klaus Doppler, Helsinki (FI); Carl Simon Wijting, Helsinki (FI)

(73) Assignee: Nokia Corporation, Espoo (FI)

( * ) Notice: Subject to any disclaimer, the term of this patent is extended or adjusted under 35 U.S.C. 154(b) by 439 days.

(21) Appl. No.: 12/665,416

(22) PCT Filed: Jun. 20, 2008

(86) PCT No.: PCT/IB2008/001631
§ 371 (c)(1),
(2), (4) Date: Jun. 30, 2010

(87) PCT Pub. No.: WO2009/001196
PCT Pub. Date: Dec. 31, 2008

(65) Prior Publication Data
US 2010/0275087 A1    Oct. 28, 2010

Related U.S. Application Data

(60) Provisional application No. 60/945,632, filed on Jun. 22, 2007.

(51) Int. Cl.
*H03M 13/00* (2006.01)
(52) U.S. Cl. ........................................ 714/749
(58) Field of Classification Search .......... 714/48–52, 714/57, 748–751, 799, 821
See application file for complete search history.

(56) References Cited

U.S. PATENT DOCUMENTS

| | | | | |
|---|---|---|---|---|
| 7,813,324 B1 * | 10/2010 | Goel et al. | | 370/336 |
| 7,895,494 B2 * | 2/2011 | Terry et al. | | 714/748 |
| 8,205,127 B2 * | 6/2012 | Wan et al. | | 714/748 |
| 2007/0280193 A1 * | 12/2007 | Kim et al. | | 370/349 |

FOREIGN PATENT DOCUMENTS

| | | |
|---|---|---|
| GB | 2417862 A | 3/2006 |
| WO | 2006126960 A1 | 11/2006 |
| WO | 2007045279 A1 | 4/2007 |

OTHER PUBLICATIONS

Wiemann, H. et al., "A Novel Multi-Hop ARQ Concept", IEEE 61st Semiannual Vehicular Technology Conference (VTC), May 30-Jun. 1, 2005.
"International Search Report and the Written Opinion of the International Searching Authority", received in corresponding PCT Application No. PCT/IB2008/001631, Dated Dec. 31 2008, 44 pages.
3GPP, R2-052057, "Comparison between single and two-layer ARQ for LTE", Aug. 2005, Ericsson.
Winner I Deliverable D3.5 "Proposal of the best suited deployment concepts for the identified scenarios and related RAN protocols", Dec. 2005.

* cited by examiner

*Primary Examiner* — Nadeem Iqbal
(74) *Attorney, Agent, or Firm* — Squire Sanders (US) LLP

(57) ABSTRACT

Disclosed herein is a method comprising detecting, by a relay node in a wireless network, an inner automatic repeat request (ARQ) error on a local link of the wireless network, and sending, in response to the detecting, an outer ARQ status report identifying one or more packets that were not successfully received, the outer ARQ status report including an originating node ID identifying the relay node as an originator of the outer ARQ status report.

20 Claims, 9 Drawing Sheets

STATUS REPORT MESSAGES FOR MULTI-LAYER ARQ PROTOCOL

RELATED APPLICATION

This application was originally filed as PCT Application No. PCT/IB2008/001631 filed Jun. 20, 2008, which claims priority to U.S. Provisional Application No. 60/945,632 filed Jun. 22, 2007.

PRIORITY CLAIM

This Application claims the benefit of priority based on U.S. Provisional Patent Application No. 60/945,632, filed on Jun. 22, 2007, entitled, "Status Report Messages for Multi-Layer ARQ Protocol," the disclosure of which is hereby incorporated by reference.

TECHNICAL FIELD

This description relates to wireless networks and automatic repeat request (ARQ) protocols.

BACKGROUND

Information transfer over wireless networks may often introduce errors. Therefore, different techniques have been employed to allow such errors to be detected and/or provide for data retransmission. For example, an automatic repeat request (ARQ) protocol may be used, at least in some cases, to allow the sending node to provide a reliable delivery. For example, a receiving node may send an acknowledgement (ACK) to the sending node to indicate successful receipt of a packet, or send a negative acknowledgement (NACK) to request retransmission of a packet. There are many varieties or types of ARQ protocols.

Wireless relay networks, or relay enhanced cells, have been developed that may provide a cell or network complimented with one or more relay nodes. The relay nodes may forward data between a base station (BS) or access point and a user terminal (UT), and may, for example, extend the coverage area of a cell or increase the capacity of a cell. Improved ARQ techniques are desirable for relay networks.

SUMMARY

According to one general aspect, a method comprises detecting, by a relay node in a wireless network, an inner automatic repeat request (ARQ) error on a local link of the wireless network, and sending, in response to the detecting, an outer ARQ status report identifying one or more packets that were not successfully received, the outer ARQ status report including an originating node ID to identify the relay node as an originator of the outer ARQ status report.

According to another general aspect, a method comprises determining whether each of a plurality of packets was successfully received from a wireless node in a wireless network, and sending, from a sending node, an outer automatic repeat request (ARQ) status report to the wireless node. The outer ARQ status report may include an originating node ID identifying the sending node as an originator of the outer ARQ status report and a bitmap. The bitmap may include only one bit for each of the plurality of packets to indicate whether each of the plurality of packets was successfully received.

According to another general aspect, a method may comprise forwarding a plurality of packets to a wireless node, receiving an outer automatic repeat request (ARQ) status report from the wireless node, and resending at least one of the plurality of packets to the wireless node based on the outer ARQ status report. The outer ARQ status report may include a bitmap indicating which of the plurality of packets were successfully received.

According to another general aspect, a method may comprise forwarding a plurality of packets to a first wireless node, receiving an outer automatic repeat request (ARQ) status report from the first wireless node, and forwarding the outer ARQ status report message to another wireless node based on the originating node ID field. The outer ARQ status report may include an originating node ID identifying the wireless node as an originator of the outer ARQ status report and a bitmap. The bitmap may indicate which of the plurality of packets were not successfully received by the first wireless node.

According to another general aspect, a relay node may include a controller. The relay node may be configured to detect an inner automatic repeat request (ARQ) error on a local link of a wireless network and send, in response to the detecting, an outer ARQ status report identifying one or more packets that were not successfully received by the relay node, the outer ARQ status report including an originating node ID of the relay node as an originator of the outer ARQ status report.

According to another general aspect, a relay node may include a controller. The relay node be configured to forward a plurality of packets to a wireless node, receive an outer automatic repeat request (ARQ) status report from the wireless node, and resend at least one of the plurality of packets to the wireless node based on the outer ARQ status report. The outer ARQ status report message may include a bitmap indicating which of the plurality of packets were successfully received.

The details of one or more implementations are set forth in the accompanying drawings and the description below. Other features will be apparent from the description and drawings, and from the claims.

DETAILED DESCRIPTION

Figure 1A:
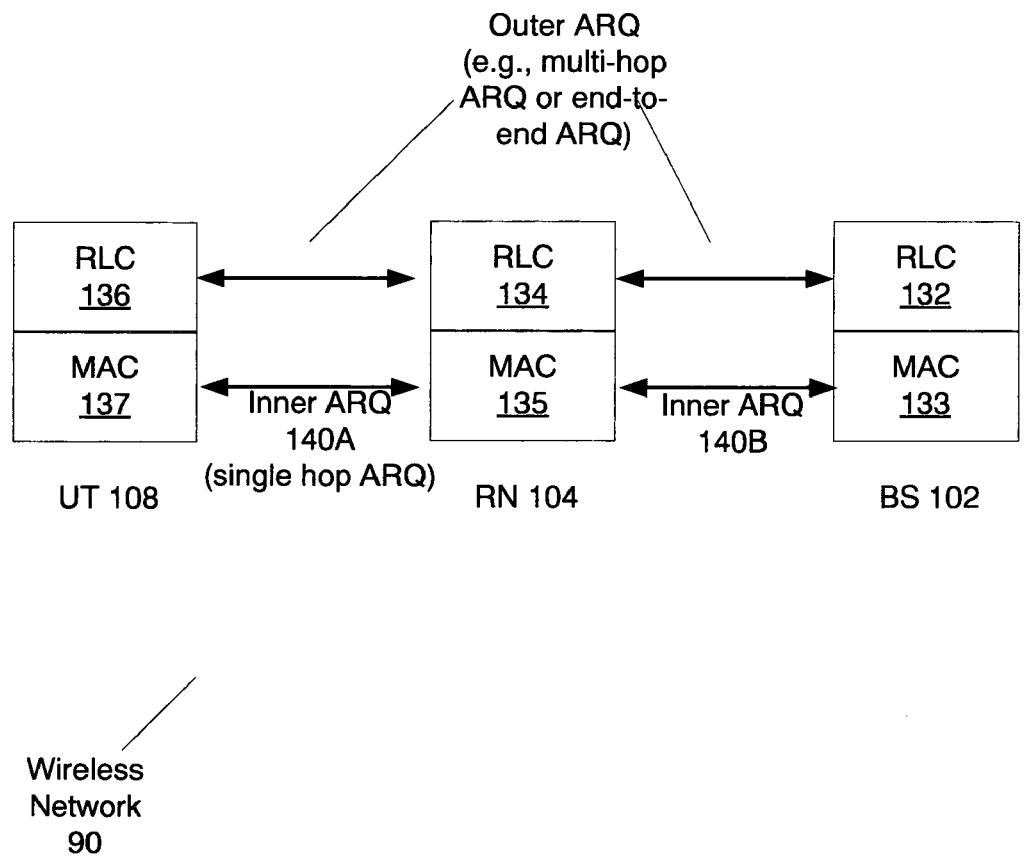
FIG. 1A is a diagram of a wireless network according to an example embodiment.

FIG. 1A is a block diagram of a wireless network 90 according to an example embodiment. The network 90 may include a number of different wireless nodes, such as, for example, a base station (BS) 102, one or more relay nodes (such as relay nodes RN 104), and a user terminal (UT) 108 according to an example embodiment. Although only one relay node is illustrated, the network 90 may include any number of relay nodes.

The wireless network 90 may be considered a relay enhanced cell, and may include any number of wireless nodes. The base station 102 may include a cellular base station, node B, or access point, or other infrastructure node according to example embodiments. The term, "base station," may be used to refer to or include any such infrastructure nodes. The base station 102 may be in wireless communication with any number of relay nodes or relay stations, such as relay node 104, and may be in wireless communication with any number of user terminals 108. The relay nodes, e.g., relay node 104, may be either fixed or mobile, and may be used to extend the coverage area of a cell or to increase the capacity at a cell's edge. The user terminal 108 may include any mobile or wireless communication device such as a cellular phone, smartphone, personal digital assistant (PDA), Wireless LAN device, WIMAX device, wireless notebook computer, or other wireless device, according to example embodiments.

Each wireless node may include a media access control (MAC) to handle media related tasks and link specific tasks, and a radio link control (RLC) to handle tasks for radio link control, for example.

According to an example embodiment, network 90 may include a multi-layer ARQ. In this example, two layers of ARQ protocols may be provided, according to an example embodiment. A local or inner ARQ process or protocol may be provided for each hop or link, e.g., an independent inner ARQ protocol for each hop or link, e.g., between MAC blocks of two adjacent nodes. For example, an inner ARQ 140A may be provided between MAC 137 of UT 108 and MAC 135 of RN 104. Similarly, an inner ARQ 140B may be provided between MAC 135 of RN 104 and MAC 133 of BS 102. The inner ARQs may use a Hybrid ARQ (HARQ), for example. Other types of ARQ protocols may be used. Each inner ARQ may be terminated at the MAC of adjacent nodes.

An outer ARQ may be provided across multiple hops or links, such as end-to-end or across two or more hops or links of a network. The example of FIG. 1A may include an example outer ARQ protocol provided between RLC 136 of UT 108 and RLC 132 of BS 102, via RLC 134 of RN 104. An outer ARQ may be terminated between RLC blocks, and provided via or through one or more intermediate nodes or relay nodes.

According to an example embodiment, each inner ARQ protocol may be link specific, and may provide a relatively fast technique for correcting most errors in network 90. However, there may be some situation's in which an inner automatic repeat request (ARQ) error on a local link of the wireless network may occur, where an outer ARQ may be relied upon to detect and/or correct the inner ARQ error.

For example, the ACK or NACK messages in the inner ARQ may not necessarily be protected via the use of a frame check sequence or CRC (cyclic redundancy check). This may allow, for example, a transmitted NACK or other control signal to be incorrectly interpreted at a receiving node as an ACK (e.g., NACK→ACK error). This inner ARQ error may go undetected by the inner ARQ of the receiving node, for example, e.g., until a next packet is received that may be out of sequence (indicating that an error has occurred). There are other situations in which an inner ARQ error may arise, which may be uncorrectable by inner ARQ or create a residual error, such as a transmitting node reaching the maximum number of retransmissions for the inner ARQ. Thus, in such cases, for example, the outer ARQ, which may use protected control messages (e.g., ACKs and NACKs that include CRC or frame check sequence), may be relied upon to detect the inner ARQ error, e.g., since the outer ARQ may be much more reliable than the inner ARQ protocol.

According to an example embodiment, a node 102 (or MAC 137 for a UT 108) in a wireless network 90 may detect an inner automatic repeat request (ARQ) error on a local (adjacent) link of the wireless network. The node 102 may then send an outer ARQ status report identifying one or more packets that were not successfully received, e.g., based on receipt of an out of sequence packet or other error condition. In an example embodiment, the outer ARQ status report may include a bit map that provides only one bit per packet that is being reported, e.g., 1 bit indicating ACK or NACK receive status for each of a plurality of packets (e.g., 1 for ACK, 0 for NACK). The receiving node may then retransmit all packets for which a NACK indication was received in the outer ARQ status report, for example. This may provide a more efficient way to provide receive status for each packet since only one bit may be required for ACK/NACK status, whereas 2 or more bits may be required to indicate ACK/NACK/RACK status using other techniques.

In addition, according to an example embodiment, the outer ARQ status report may include an originating node ID to identify the node that originated the outer ARQ status report. For example, the node ID may be a 0 to identify the UT, a 1 to indicate RN1 (first RN after UT), a 2 to indicate RN2, a 3 to indicate RN3, and n to indicate RNn originated or generated the outer ARQ status report. The use may allow, for example, the BS to poll or request an outer ARQ status report from each RN and UT, so the BS can obtain information describing packets that have not been transmitted, and their location in the network, e.g., which may be used to make handoff decisions to other base stations or relay nodes. Thus, in an example embodiment, the use of the ACK/NACK bit in the bit map to indicate ACK/NACK receive status for each reported packet, and the node ID identifying the originator of the outer ARQ status report may identify the error and the source or location of the error.

In an example embodiment, a relay node (RN), a base station (BS) or a user terminal (UT) may each generate and send an ARQ status report in response to detecting an inner ARQ error on a local (or adjacent) link of the wireless network. The RNs and UTs may each generate and send another ARQ status report in response to a poll or request from a base station or Access Point (AP), e.g., for handover processing. Also, the RN, BS and UT may each generate and transmit an outer ARQ status report at specific times or periodically, for example. A number of other details and examples will now be described.

Figure 1B:
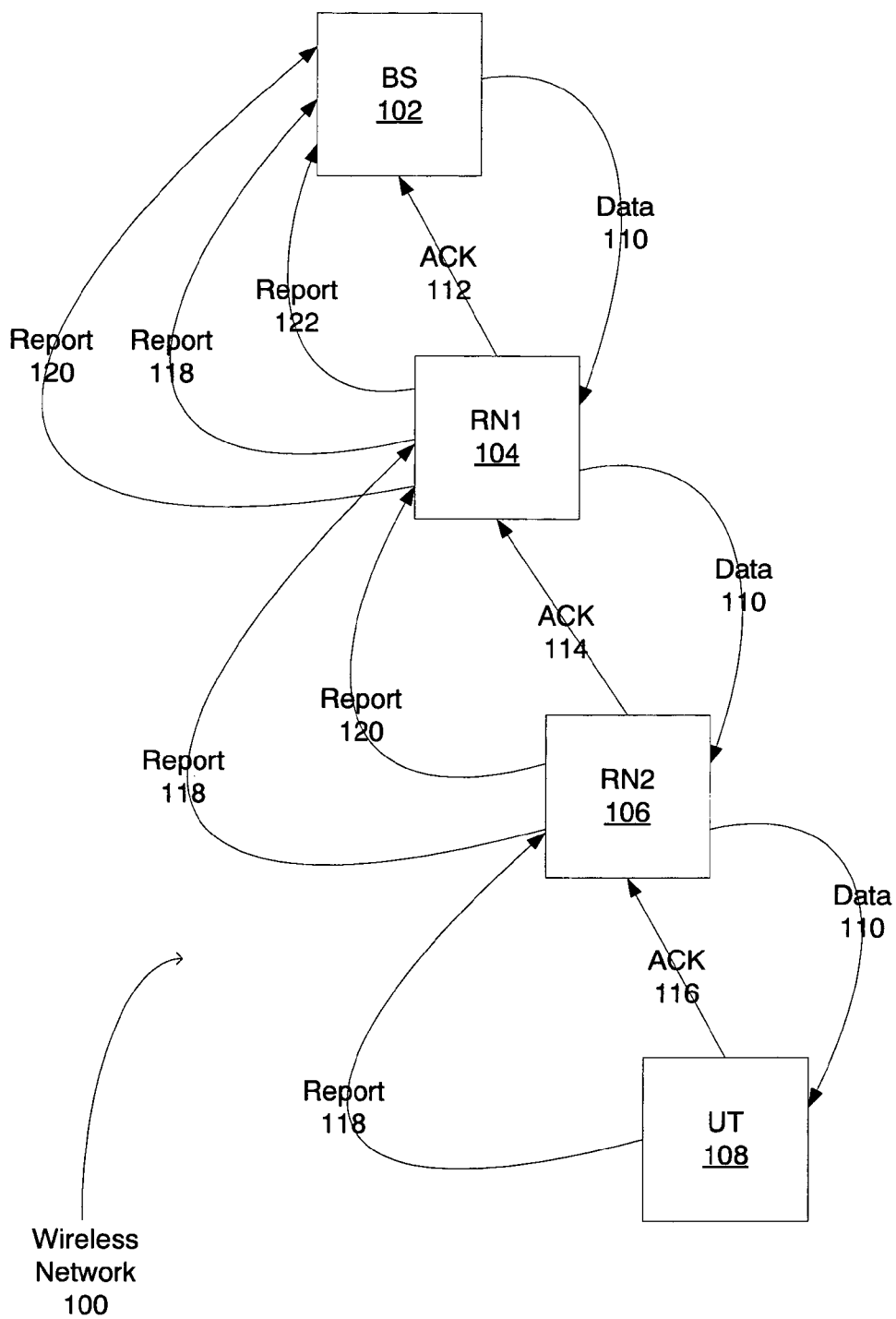
FIG. 1B is a block diagram of a wireless network including a base station, two relay nodes, and a user terminal according to an example embodiment.

FIG. 1B is a block diagram of a wireless network including a base station, two relay nodes, and a user terminal according to an example embodiment.

An outer ARQ protocol may be provided between the base station 102 and user terminal 108, via relay nodes 104, 106. Inner ARQ protocols may be provided for each link.

In the example shown in FIG. 1, the base station 102 may send the data packet 110 to the first relay node 104 via their local link. The data packet 110 may include encoding such as a frame check sequence or cyclic redundancy coding for detection and/or correction of errors. The data packet 110 may also include a sequence number to identify the data packet 110 and distinguish the data packet 110 from other data packets.

The first relay node 104 may receive the data packet 110. If the first relay node 104 determines that the data packet 110 was successfully received, e.g., based on an attached CRC or other error detection technique, then the first relay node 104 may send an acknowledgment (ACK) 112 to the base station 102, in accordance with an inner automatic repeat request (ARQ) protocol for that link. The ACK 112 may include the sequence number of the data packet 110 to identify the ACK 112 as corresponding to the data packet 110 rather than any other data packet. The ACK 112 may not necessarily include CRC or protection, e.g., providing a smaller control packet and less overhead, according to an example embodiment.

If the first relay node 104 determines that the data packet 110 was not successfully received, then the first relay node 104 may send a negative acknowledgment (NACK) (not shown in FIG. 1B) to the base station 102, in accordance with the inner ARQ protocol. Similarly, NACKs may not necessarily include CRC or other error protection, for example. If the base station 102 correctly receives the NACK, or if the base station 102 does not receive the ACK 112 within a specified period of time after listening for the ACK 112 to be sent by the first relay node 104 in response to the data packet 110, then the base station 102 may, for example, resend the data packet 110 to the relay node 104. According to an example embodiment which may use a hybrid automatic repeat request (HARQ) protocol, which may be considered a type of the ARQ protocol, the data packet 110 may be resent with a different level or type of encoding, such as by including more parity bits, different coding scheme, etc., which may increase the likelihood of the data packet 110 of being successfully received the second time.

In some situations, errors in transmission or interference from other wireless devices may cause a NACK (or other signal or packet) to be received or erroneously interpreted as an ACK, or the base station 102 to process an ACK when no ACK was sent by the first relay node 104. This erroneous receipt or interpretation may be considered an inner ARQ error on the local link of the wireless network 100 between the base station 102 and the first relay node 104.

The first relay node 104 may receive the data packet 110 and forward the data packet 110 to the second relay node 106 via the local link between the first relay node 104 and the second relay node 106. The data packet 110 may be identical to the data packet 110 received by the first relay node 104, or may include data indicating the data packet's 110 updated location within the wireless network 100. If the second relay node 106 successfully receives the data packet 110, the second relay node 106 may send an ACK 114 to the first relay node 104, according to the inner ARQ protocol described above. If the second relay node 106 determines that the data packet 110 includes errors, the second relay node 106 may send a NACK to the first relay node 104. If the first relay node 104 receives the NACK, or if the first relay node 104 does not receive the ACK 114 within a specified period of time after listening for the ACK 114 to be sent by the first relay node 106 in response to the data packet 110, then the first relay node 104 may resend the data packet 110, according to the ARQ protocol; the data packet 110 may be resent, e.g., with additional or different encoding, according to the HARQ protocol. An inner ARQ error may occur on the local link between the first relay node 104 and the second relay node 106 when the second relay node 106 sends a NACK, but the first relay node 104 interprets the ACK as having been sent. Other types of inner ARQ errors may occur, and the NACK→ACK error described herein is merely used as an example.

Upon successful receipt of the data packet 110, the second relay node 106 may forward or send the data packet 110 to the user terminal 108. The user terminal 108 may acknowledge receipt of the data packet 110 by sending an ACK 116 to the second relay node 106. If the user terminal 108 determines that the data packet was not successfully received, the user terminal 108 may send a NACK to the second relay node 106. According to the inner ARQ protocol, the second relay node 106 may resend the data packet 110 upon receiving a NACK or upon not receiving the ACK 116 after a specified period of time listening for the inner ARQ ACK to be sent by the user terminal 108 in response to the data packet 110.

According to an outer ARQ protocol, the wireless nodes 102, 104, 106, 108 may generate outer ARQ status reports 118, 120, 122 which identify one or more data packets 110 which were not successfully received by the node 102, 104, 106, 108 which generated the status report 118, 120, 122. The data packets 110 which were not successfully received may be determined, for example, by detecting that a received data packet includes a sequence number that is out of sequence with the other received data packets, for example. The wireless nodes 102, 104, 106, 108 may detect an inner ARQ error on a local link of the wireless network 100 by, for example, receiving a data packet 100 that is out of sequence, which may have been prevented if a NACK had been properly received and processed. This is merely an example, and other inner ARQ errors may occur. While FIG. 1 shows status reports 118, 120, 122 being sent in the uplink direction to remedy transmission errors of data packets being sent in the downlink direction, status reports may also be sent in the downlink direction to remedy transmission errors of data packets being sent in the uplink direction.

The user terminal 108 may maintain a list of data packets 110 which have been successfully and/or unsuccessfully received, according to an example embodiment. The user terminal 108 may generate an outer ARQ status report 118 (example report shown in greater detail in FIG. 3) periodically, or in response to detecting an inner ARQ error on the local link between the user terminal 108 and the second relay node 106, or in response to receiving a poll or request from the second relay node 106 or from base station 102. The poll or request may have originated in the second relay node 106, or may be forwarded by the second relay node 106 from the first relay node 104 after originating in either the first relay node 104 or the base station 102. The poll or request may have been generated by the base station 102 or relay node 104, 106 in response to a handover request, according to an example embodiment. The status report 118 may be included in a data frame or packet sent from the user terminal 108 to the second relay node 106 in a "piggybacking" mode, according to an example embodiment.

The status report 118 may identify one or more data packets that were not successfully received by the user terminal 108 and/or one or more data packets that were successfully received by the user terminal. The status report 118 may, for example, include one bit to report the receive status (ACK or NACK) of each of a plurality of packets. For example, the ACKs may be represented by 1's and the NACKs by 0's, or vice versa. According to an example embodiment, a bitmap, such as an ACK/NACK bitmap, may include only one bit for each packet being reported in the outer ARQ status report 118. The status report 118 may also include an originating node ID identifying the user terminal as an originator of the outer ARQ status report 118, according to an example embodiment.

The status report 118 originating with the user terminal 108 may be transmitted to the base station 102 via local links with the relay nodes 104, 106, or may be transmitted only to the second relay node 106. The second relay node 106 may receive the status report 118. The second relay node 106, which may have forwarded a plurality of packets to the user terminal 108, may receive the status report 118 from the user terminal 108. The status report 118 indicating that one or more packets, which were forwarded by the second relay node 106 to the user terminal 108, were not successfully received by the user terminal 108. In one example, the second relay node 106 may resend to the user terminal 108 the one or more packets which were not successfully received in response to receiving the status report 118. In another example, the second relay node 106 may forward the status report 118 to the first node 104. The second relay node 106 may thereafter receive, from the first node 104, the one or more packets which were not successfully received, and forward the one or more packets to the user terminal. A determination of whether to forward the status report 118 or to resend the packets may be made based on the originating node ID field included in the status report 118 (e.g., where the originating node ID may both identify the originator and indicate whether the report should be forwarded), or may be made based on a separate forwarding field included in the status report 118 that may indicate whether the outer ARQ status report should be forwarded, according to example embodiments.

In the example in which the status report 118 is forwarded to the first relay node 104, the first relay node 104 may either resend to the second relay node 106 the packets which were not successfully received, or may forward the status report 118 to the base station 102. If the status report 118 is forwarded to the base station 102, the base station 102 may resend the packets to the first relay node 104 to be transmitted to the user terminal 108 via the first relay node 104 and the second relay node 106, according to an example embodiment. The node which resends the packets may store the packets in its buffer until receiving a status report 118 originated from the final destination (UT 108) for the packets indicating that all of the packets have been successfully received, or for a predetermined period of time, according to example embodiments.

The second relay node 106 may also generate an outer ARQ status report 120, according to an example embodiment. The second relay node 106 may generate and send the status report 120 in response to detecting an inner ARQ error on a local link, according to an example embodiment. According to other example embodiments, the second relay node 106 may generate and send the status report 120 periodically, or in response to a poll or request from the first relay node 104 (or from the user terminal 108, in the example of a status report which will be sent to the user terminal 108 to indicate whether packets were successfully received from the user terminal 108). The status report 120 may be included in a data packet or frame sent by the second relay node 106 in a piggybacking mode, according to an example embodiment.

The status report 120 may include some or all of the fields as the status report 118 sent by the user terminal 108. The status report 120 may include one bit to report the receive status of each of a plurality of packets as either an ACK or a NACK, and/or may include an ACK/NACK bitmap that includes one bit for each packet being reported in the outer ARQ status report 120, according to example embodiments. The status report 120 may include an address of the second relay node 106 as the originator of the status report 120, and may also include a separate forwarding field indicating whether the status report 120 should be forwarded, according example embodiments. Since the outer ARQ status report is originated by RN 106, the status report may indicate only whether or not one or more packets were successfully received at RN 106.

The second relay node 106 may send the status report 120 to the first relay node 104. The first node 104 may, in response to receiving the status report 120, resend to the second relay node 106 the packets which the status report 120 indicates were not successfully received, or may forward the status report to the base station 102. The first node 104 may determine whether to forward the status report 120 based on the address or forwarding field included in the status report 120, according to example embodiments. If the first node 104 forwards the status report 120 to the base station 102, the base station 102 may resend to the first relay node 104 the packets which the status report 120 indicates were not successfully received, and the first relay node 104 may forward the packets which were not successfully received to the second relay node 106. The base station 102 may have stored the packets in its buffer until receiving a status report indicating that the packets were successfully received, or until a predetermined time period has expired, according to example embodiments.

The first relay node 104 may generate and send to the base station 102 a status report 122. The status report 122 may be generated and sent in response to determining an inner ARQ local link error, periodically, or in response to a poll or request from the base station 102, for example. The status report 122 may be included in a data packet or frame sent to the base station 102 in a piggybacking mode, according to an example embodiment.

The status report 122 may include some or all of the fields as the status reports 118, 120 sent by the user terminal 108 and second relay node 106. The status report 122 may include one bit to report the receive status of each of a plurality of packets as either an ACK or a NACK, and/or may include an ACK/NACK bitmap that includes one bit for each packet being reported in the outer ARQ status report 122, according to example embodiments. The status report 122 may indicate, for example, whether the one or more packets were successfully received by the first relay node 104, according to an example embodiment, since RN 104 is identified as the originator. The status report 122 may include an address of the first relay node 104 as the originator of the status report 122 or a forwarding field indicating whether the status report 122 should be forwarded, according example embodiments.

The base station 102 may receive the status report 122 and resend the packets which the status report 122 indicates were not successfully received. The base station 102 may have stored the packets in its buffer until receiving a status report indicating that the packets were successfully received, or until a predetermined time period has expired, according to example embodiments. After receiving the status report indicating that the packets were successfully received, or after the predetermined time period has expired, the base station 102 may erase the packets from its buffer.

In the example embodiments in which the relay nodes 104, 106 forward and/or send status reports to the base station 102, the base station 102 may receive separate status reports 118, 120, 122 from each of the relay nodes 104, 106 and the user terminal 108. The status reports 118, 120, 122 may each indicate the ACK/NACK status of packets for each respective node. Where, for example, the status reports 118, 120, 122 are sent in response to a poll or requests or detections of inner ARQ errors on local links, the base station 102 may receive timely information regarding only the relevant node.

Figure 2:
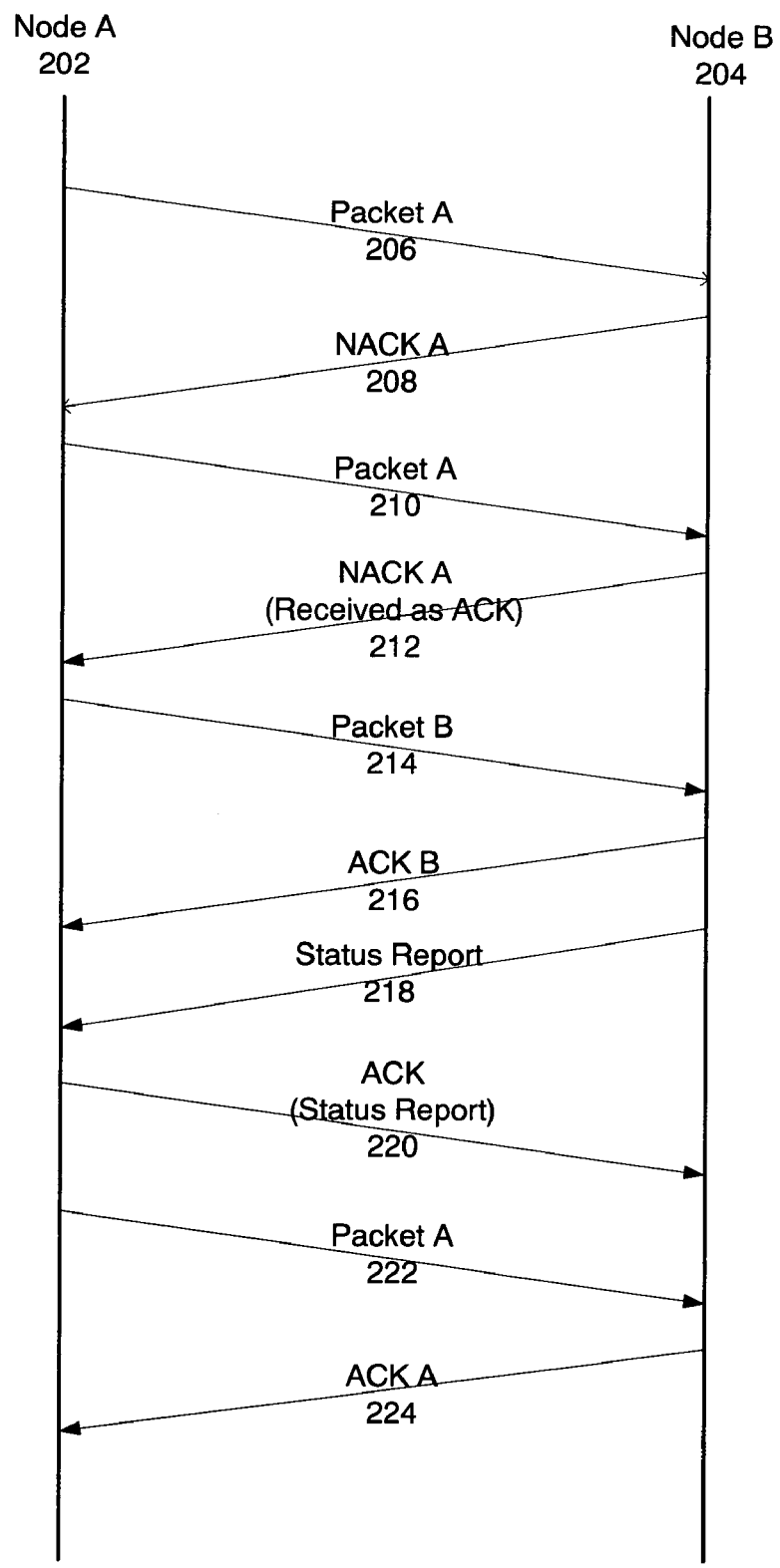
FIG. 2 is a vertical-time sequence diagram showing messages communicated between two nodes according to an example embodiment.

FIG. 2 is a diagram showing messages communicated between two nodes 202, 204 according to an example embodiment. The first node 202 and second node 204 may, respectively, correspond to the base station 102 and first relay node 104, first relay node 104 and second relay node 106, or second relay node 106 and user terminal 108, according to example embodiments.

In the example shown in FIG. 2, the first node 202 sends a first packet 206 to the second node 204. In this example, the first packet 206 is erroneously transmitted and/or includes errors which are detected by the second node 204. In accordance with the inner ARQ protocol, the second node 204 sends a NACK 208 to the first node 202, the NACK 208 indicating that the first packet 206 was not successfully received. The first node 202 resends the first packet 210 to the second node 204. In this example, the first packet 206 is again erroneously transmitted and/or includes errors which are detected by the second node 204. Accordingly, the second node 204 again sends a NACK 212 to the first node 202 indicating that the first packet 210 was erroneously received.

However, in this example, due to errors in transmission and/or processing, the NACK 212 is interpreted by the first node 202 as an ACK, acknowledging successful receipt of the first packet 210. Accordingly, the first node 202 sends a second packet 214 to the second node 204, which is successfully received. The second node 204 acknowledges successful receipt of the second packet 214 by sending an ACK 216 to the first node 202.

However, the second node 204 also detects that an inner ARQ error, namely, the interpretation of the NACK 212 as an ACK, occurred on a local link (for example). This detection may be based on determining that a sequence number included in the second packet 214 was out of sequence. In accordance with the outer ARQ protocol, the second node 204 sends a status report 218 to the first node 202. The status report 218 identifies the first packet 210 as not being successfully received. Upon receipt of the status report 218, the first node 202 sends an ACK 220 to the second node 204 acknowledging receipt of the status report 218. The first node 202 also resends the first packet 222 in response to receiving the status report 218. The first packet 222 may include additional encoding, as did the first packet 210, to reduce the likelihood of another error in transmission. Upon successful receipt of the first packet 222, the second node may send an ACK 224 to the first node 224 acknowledging successful receipt of the first packet 222.

The operations described with reference to the second node 204 may be performed by either of the relay nodes 104, 106. The relay nodes 104, 106 may also receive and forward status reports 218 sent by another relay node 104, 106, the base station 102, and/or the user terminal 108.

Figure 3:
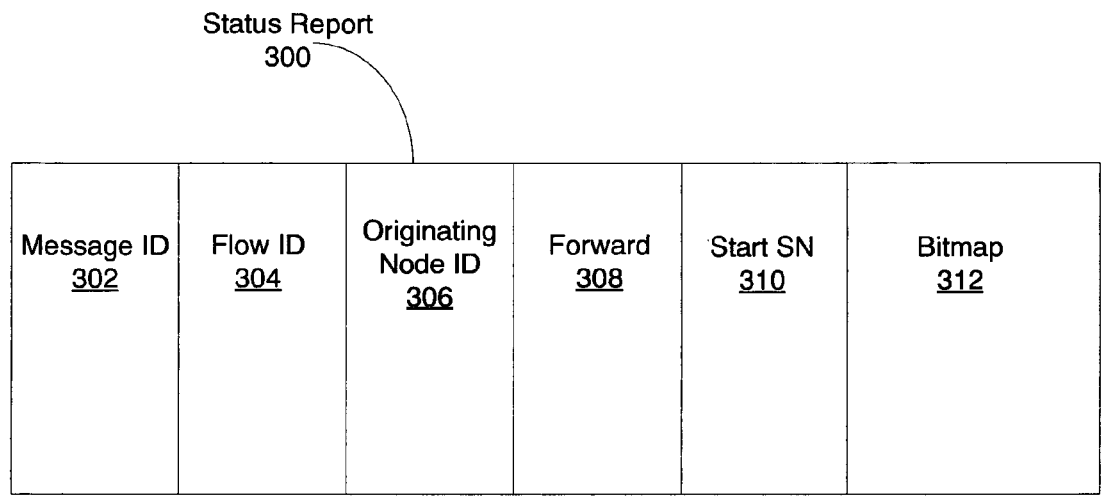
FIG. 3 is a block diagram of a status report according to an example embodiment.

FIG. 3 is a block diagram of a status report 300 according to an example embodiment. The status report 300 may be sent, received, and/or forwarded by the relay nodes 104, 106, and may be sent and/or received by the base station 102 and user terminal 108. The status report 300 shown in FIG. 3 may be an example of the status reports 118, 120, 122, 218 described with reference to FIGS. 1B and 2.

In the example embodiment shown in FIG. 3, the status report 300 may include a message ID field 302, a flow ID field 304, an originating node field 306, a forward field 308, a start sequence number field 310, and a bitmap field 312. The message ID field 302 may indicate that the status report 300 is an outer ARQ status report. The flow ID field 304, for example, may identify a flow, such as a group of packets from one application or user, or which user terminal 108 the status report 300 belongs to. The originating node ID field 306 may identify which node, such as the base station 102, the first relay node 104, the second relay node 106, or the user terminal 308, originated the outer ARQ status report 300. In an alternate embodiment, the originating node ID field 306 may identify the originating node only as either the user terminal 108 or one of the relay nodes 104, 106; in this alternative embodiment, the originating node ID field 306 may include only one bit (e.g. 0 indicating a user terminal and 1 indicating a relay node). The forward field 308 may indicate whether the status report 300 should be forwarded by the relay node 104, 106 to the base station 102; in embodiments in which the decision whether to forward the status report 300 is made based on the originating node ID field 306, the forward field 308 may be omitted. The start sequence number field 310 may indicate a starting sequence number of the packets for which the ACK/NACK status is indicated by the bitmap field 312. The bitmap field 312 may include bits corresponding to each packet for which the successful or unsuccessful receipt is being identified; the bitmap field 312 may include or, alternatively, may consist essentially of, a number of bits equal to the number of packets for which the ACK/NACK status is being indicated. The may also include redundant or parity coding for error detection and/or correction, such as cyclic redundancy coding.

Figure 4:
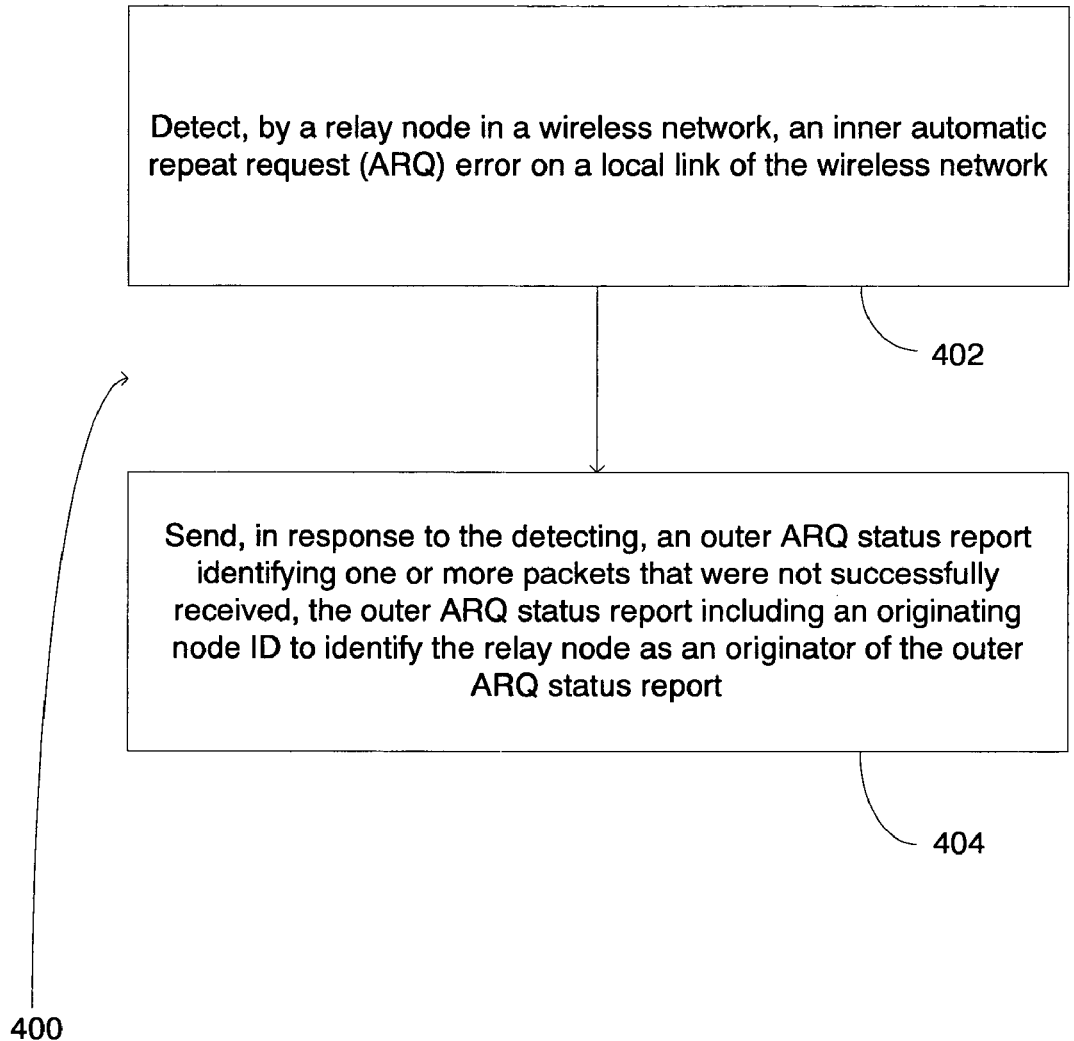
FIG. 4 is a flowchart showing a method according to an example embodiment.

FIG. 4 is a flowchart showing a method 400 according to an example embodiment. According to this example, the method 400 may include detecting, by a relay node 104, 106 in a wireless network 100, an inner automatic repeat request (ARQ) error on a local link of the wireless network 100 (402). According to an example embodiment, the detecting the inner ARQ error (402) may include detecting that the one or more packets were not successfully received via the local link of the wireless network 100. According to another example, the detecting (402) may include determining that a negative acknowledgment (NACK) transmitted for the one or more packets was not successfully received by a receiving node at another end of the local link. According to another embodiment, the detecting (402) may include receiving a packet that is out of sequence.

The method 400 may also include sending, in response to the detecting (402), an outer ARQ status report 120, 122 identifying one or more packets that were not successfully received (404). The outer ARQ status report 120, 122 may include an originating node ID identifying the relay node 104, 106 as an originator of the outer ARQ status report 120, 122. The sending (404) may include sending the outer ARQ status report 120, 122, the outer ARQ status report 120, 122 being included or piggy backed in a data frame, according to an example embodiment. According to another example embodiment, the sending (404) may include sending the outer ARQ status report 120, 122, the outer ARQ status report 120, 122 not indicating whether the one or more packets were successfully received by any node other than the relay node 104, 106.

In an example embodiment, the outer ARQ status report 120, 122 may include one bit to report the receive status of each of a plurality of packets, the receive status of each packet being indicated as either ACK (acknowledgment) or NACK (negative acknowledgment). In another example embodiment, the outer ARQ status report 120, 122 may comprise an ACK/NACK bitmap 312 which may include only one bit for each packet being reported in the outer ARQ status report 120, 122.

In an example embodiment, the method 400 may further comprise sending an inner ARQ negative acknowledgment (NACK) indicating that the one or more packets were not successfully received. The inner ARQ negative acknowledgement may include a packet sequence number or other field to identify for which packet the NACK applies, for example. In another example embodiment, the method 400 may include receiving the one or more packets from a node to which the outer ARQ status report 118, 120 was sent.

In another example embodiment, the method 400 may further include forwarding a plurality of packets to another node; receiving, from the another node, another outer ARQ status report 120, 122 indicating that one or more of the plurality of packets were not successfully received by the another node; and forwarding the another outer ARQ status report 120, 122 to a third node to which the outer ARQ status report 120, 122 was sent.

In another example embodiment, the method 400 may further include forwarding the plurality of packets to another node; receiving, from the another node, another outer ARQ status report indicating that one or more of the plurality of packets were not successfully received by the another node; and forwarding the another outer ARQ status report to a third node to which the outer ARQ status report was sent.

In another example embodiment, the method 400 may further include receiving, from another node, another outer ARQ status report indicating that one or more packets of a plurality of packets were not successfully received by the another node and including a forwarding field indicating that the another outer ARQ status report should be forwarded; forwarding the another outer ARQ status report to a third node based on the forwarding field; receiving the one or more packets of the plurality of packets from the third node; and forwarding to the another node the one or more packets of the plurality of packets which were not successfully received by the another node.

In another example embodiment, the method 400 may further include forwarding a plurality of packets to another node; receiving, from the another node, another outer ARQ status report indicating at least one packet from the plurality of packets which was not successfully received by the another node and including a second originating node ID identifying the another node as the originator of the another outer ARQ status report; and forwarding the another outer ARQ status report to a third node based on the originating node ID field.

Figure 5:
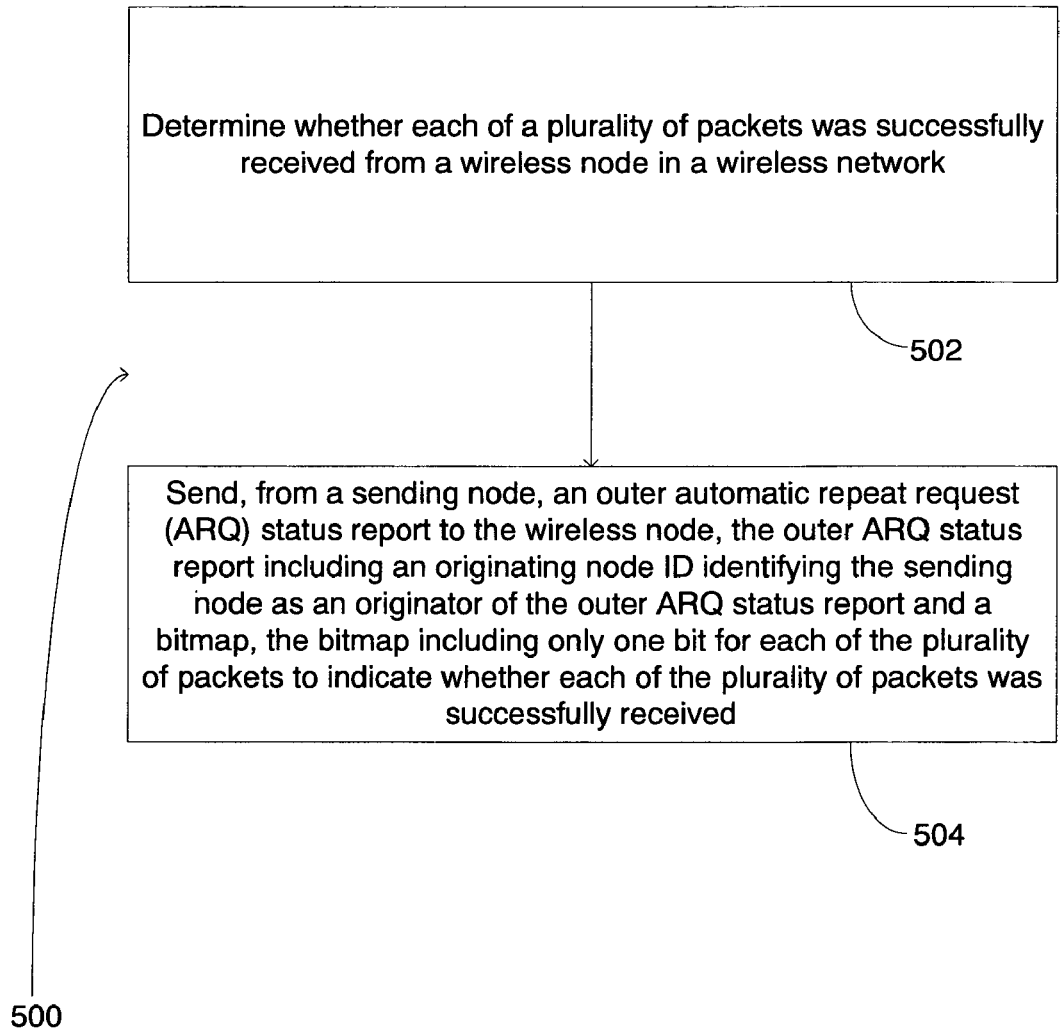
FIG. 5 is a flowchart showing another method according to another example embodiment.

FIG. 5 is a flowchart showing another method 500 according to another example embodiment. According to this example, the method 500 may include determining whether each of a plurality of packets was successfully received from a wireless node in a wireless network (502). The method 500 may further include sending, from a sending node, an outer automatic repeat request (ARQ) status report to the wireless node (504). The outer ARQ status report message may include an originating node ID identifying the sender as an originator of the outer ARQ status report and a bitmap. The bitmap may, for example, include only one bit for each of the plurality of packets to indicate whether each of the plurality of packets was successfully received.

According to an example embodiment, the determining (502) may include determining, by a relay node, whether each of the plurality of packets was successfully received. In this example, the sending (504) includes sending, by the relay node, the outer ARQ status report message to the wireless node.

According to an example embodiment, the method 500 may be performed periodically. According to another example embodiment, the method 500 may be performed in response to receiving a poll or request, e.g., from a base station or other node. The polling request may, for example, be sent by a base station in response to a handover request.

Figure 6:
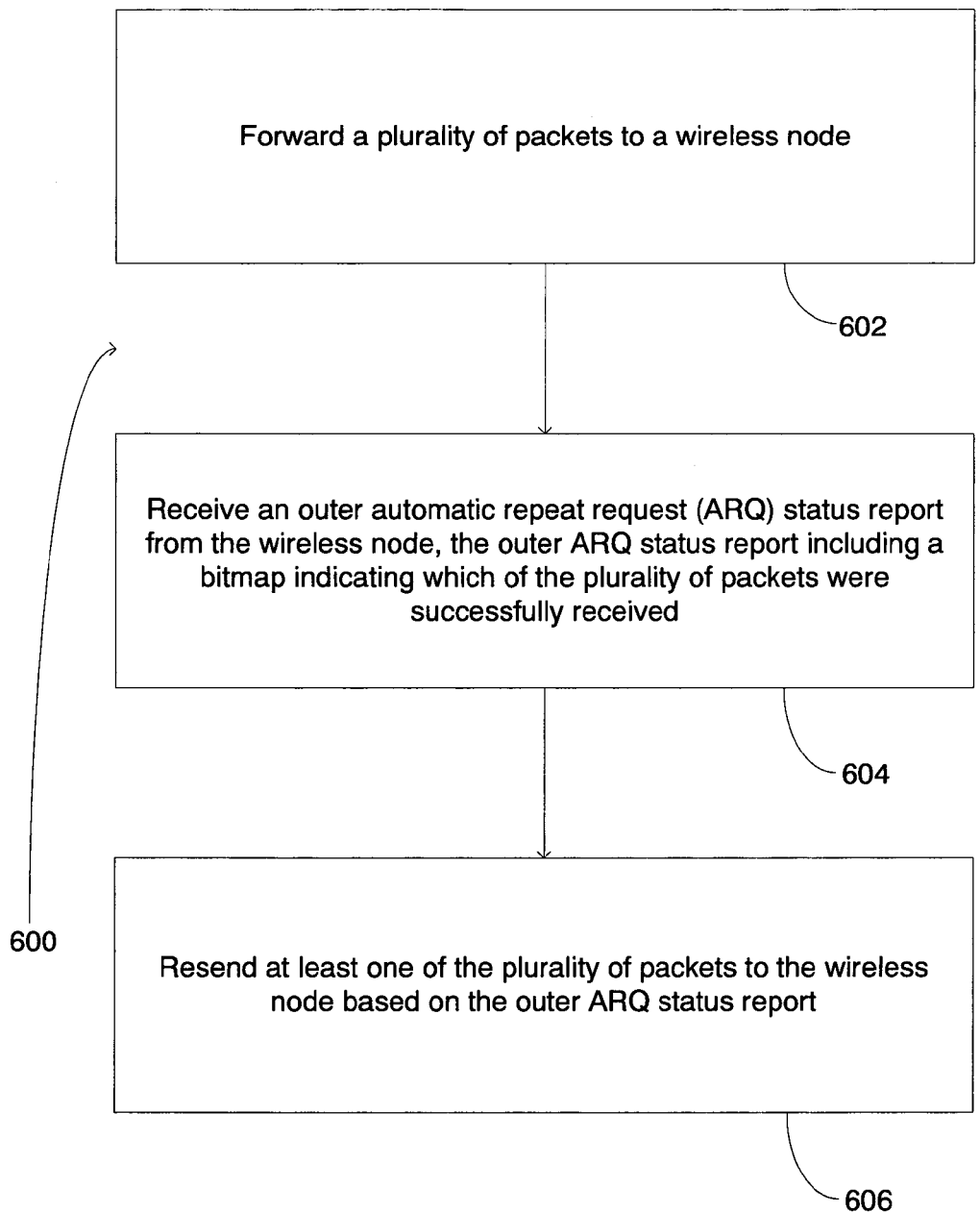
FIG. 6 is a flowchart showing another method according to another example embodiment.

FIG. 6 is a flowchart showing another method 600 according to another example embodiment. In this example, the method 600 may include forwarding a plurality of packets to a wireless node (602). The method 600 may further include receiving an outer automatic repeat request (ARQ) status report from the wireless node, the outer ARQ status report including a bitmap indicating which of the plurality of packets were successfully received (604). The method 600 may further include resending at least one of the plurality of packets to the wireless node based on the outer ARQ status report message (606).

According to an example embodiment, the receiving (604) may include receiving the outer ARQ status report message from the wireless node, the outer ARQ status report message being included in, or piggy-backed on, a data frame.

According to another example embodiment, the method 600 may include sending an acknowledgment to the wireless node in response to receiving the outer ARQ status report message.

According to another example embodiment, the method 600 may further include listening for an inner ARQ acknowledgment message to be sent by the wireless node in response to each of the plurality of packets, and resending at least one of the plurality of packets to the wireless node based on not receiving at least one inner ARQ acknowledgment message.

According to another example embodiment, the method 600 may include sending, to the wireless node, a polling request for the outer ARQ status report message.

Figure 7:
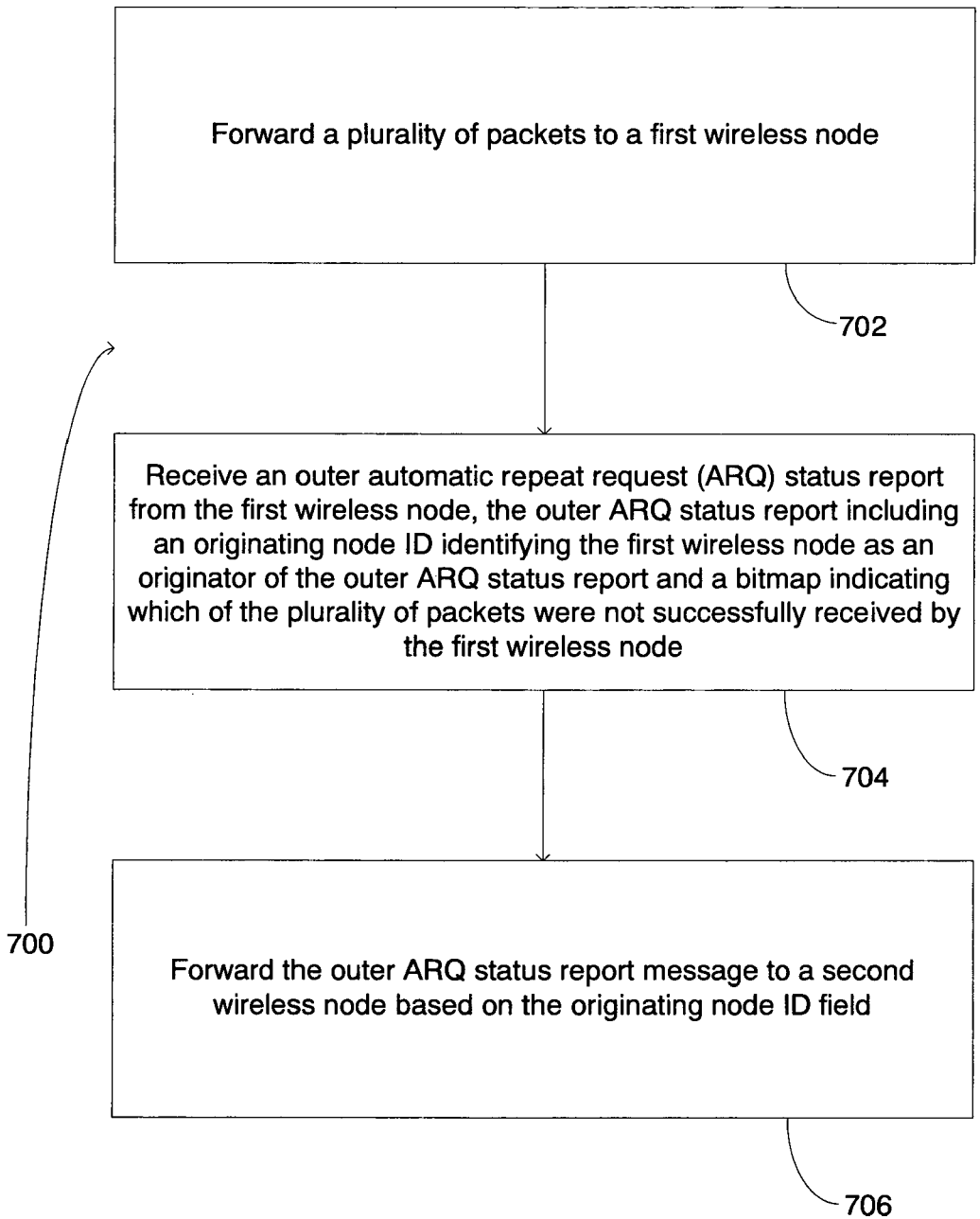
FIG. 7 is a flowchart showing another method according to another example embodiment.

FIG. 7 is a flowchart showing another method 700 according to another example embodiment. According to this example, the method 700 may include forwarding a plurality of packets to a first wireless node (702). The method 700 may further include receiving an outer automatic repeat request (ARQ) status report from the wireless node, the outer ARQ status report including an originating node ID identifying the first wireless node as an originator of the outer ARQ status report and a bitmap indicating which of the plurality of packets were not successfully received by the first wireless node (704). The method 700 may further include forwarding the outer ARQ status report message to another (second) wireless node based on the originating node ID field (706).

According to an example embodiment, the method 700 may further include forwarding to the wireless node the packets which were not successfully received.

According to another example embodiment, the method 700 may further include generating and sending, by a relay node, to the second wireless node a second outer ARQ status report. The another ARQ status report may include a second originating node ID field and another bitmap indicating which of the plurality of packets were not successfully received by the relay node.

Figure 8:
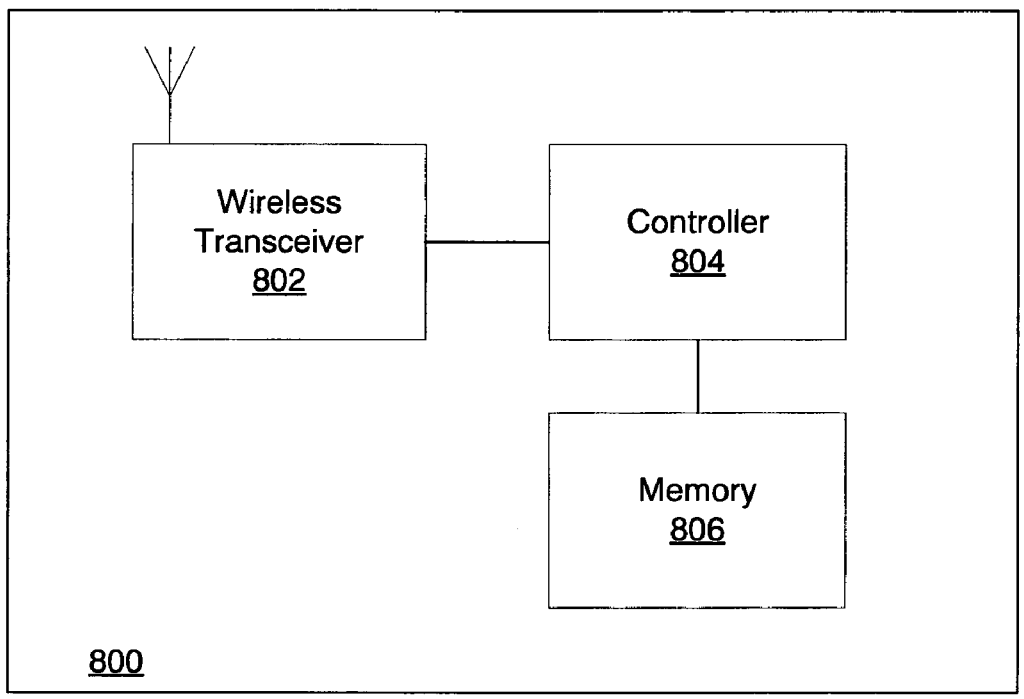
FIG. 8 is a block diagram of a wireless node according to an example embodiment.

FIG. 8 is a block diagram of a wireless node 800 according to an example embodiment. The wireless node (e.g. base station 102, relay node 104, 106, or user terminal 108) may include, for example, a wireless transceiver 802 to transmit and receive signals, a controller 804 to control operation of the station and execute instructions or software, and a memory 806 to store data and/or instructions.

Controller 804 may be programmable and capable of executing software or other instructions stored in memory or on other computer media to perform the various tasks and functions described above, such as one or more the tasks or methods described above.

In addition, a storage medium may be provided that includes stored instructions, when executed by a controller or processor that may result in the controller 804, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   detecting, by a relay node in a wireless network, an inner automatic repeat request (ARQ) error on a local link of the wireless network; and
   sending, in response to the detecting, an outer ARQ status report identifying one or more packets that were not successfully received, the outer ARQ status report including an originating node identifier (ID) to identify the relay node as an originator of the outer ARQ status report.

2. The method of claim 1, wherein the originating node ID is a connection ID.

3. The method of claim 1, wherein the detecting the inner ARQ error comprises detecting that the one or more packets were not successfully received via the local link of the wireless network.

4. The method of claim 1, wherein the detecting includes determining that a negative acknowledgment (NACK) transmitted for the one or more packets was not successfully received by a receiving node at another end of the local link.

5. The method of claim 1, wherein the detecting includes receiving a packet that is out of sequence.

6. The method of claim 1, wherein the sending includes sending the outer ARQ status report, the outer ARQ status report being included or piggy-backed in a data frame.

7. The method of claim 1, wherein the sending includes sending the outer ARQ status report, the outer ARQ status report not indicating whether the one or more packets were successfully received by any node through which the relay node received the one or more data packets.

8. The method of claim 1, wherein the outer ARQ status report includes one bit to report the receive status of each of a plurality of packets, the receive status of each packet being indicated as either ACK (acknowledgement) or NACK (negative acknowledgement).

9. The method of claim 1, wherein the outer ARQ status report comprises an ACK/NACK bitmap consisting essentially of one bit for each packet being reported in the outer ARQ status report.

10. The method of claim 1 further comprising sending an inner ARQ negative acknowledgement (NACK) indicating that the one or more packets were not successfully received, the inner ARQ negative acknowledgement including a packet sequence number or other field to identify for which packet the NACK applies.

11. The method of claim 1, further comprising:
    forwarding a plurality of packets to another node;
    receiving, from the another node, another outer ARQ status report indicating that one or more packets from the plurality of packets were not successfully received by the another node; and
    resending the one or more packets from the plurality of packets to the another node in response to the receiving.

12. The method of claim 1, further comprising:
    forwarding the plurality of packets to another node;
    receiving, from the another node, another outer ARQ status report indicating that one or more of the plurality of packets were not successfully received by the another node; and forwarding the another outer ARQ status report to a third node to which the outer ARQ status report was sent.

13. The method of claim 1, further comprising:
receiving, from another node, another outer ARQ status report indicating that one or more packets of a plurality of packets were not successfully received by the another node and including a forwarding field indicating that the another outer ARQ status report should be forwarded;
forwarding the another outer ARQ status report to a third node based on the forwarding field;
receiving the one or more packets of the plurality of packets from the third node; and
forwarding to the another node the one or more packets of the plurality of packets which were not successfully received by the another node.

14. The method of claim 1, further comprising:
forwarding a plurality of packets to another node;
receiving, from the another node, another outer ARQ status report indicating at least one packet from the plurality of packets which was not successfully received by the another node and including a second originating node ID identifying the another node as the originator of the another outer ARQ status report; and
forwarding the another outer ARQ status report to a third node based on the originating node ID field.

15. A method comprising:
forwarding a plurality of packets to a wireless node;
receiving an outer automatic repeat request (ARQ) status report from the wireless node, the outer ARQ status report including a bitmap indicating which of the plurality of packets were successfully received; and
resending at least one of the plurality of packets to the wireless node based on the outer ARQ status report.

16. The method of claim 15, wherein the receiving includes receiving the outer ARQ status report message from the wireless node, the outer ARQ status report message being included or piggy-backed in a data frame.

17. The method of claim 15, further comprising sending an acknowledgment to the wireless node in response to receiving the outer ARQ status report message.

18. The method of claim 15, further comprising sending, to the wireless node, a polling request for the outer ARQ status report message.

19. A relay node comprising a controller, the relay node configured to:
detect an inner automatic repeat request (ARQ) error on a local link of a wireless network; and
send, in response to the detecting, an outer ARQ status report identifying one or more packets that were not successfully received by the relay node, the outer ARQ status report including an originating node ID identifying the relay node as an originator of the outer ARQ status report.

20. The relay node of claim 19, wherein the originating node ID is a connection ID.

* * * * *